United States Patent [19]
Ueda et al.

[11] Patent Number: 4,490,809
[45] Date of Patent: Dec. 25, 1984

[54] MULTICHIP DATA SHIFTING SYSTEM

[75] Inventors: Kohichi Ueda, Tokyo; Shigemi Kamimoto, Kawasaki; Akira Miyata, Tokyo, all of Japan

[73] Assignee: Fujitsu Limited, Kawasaki, Japan

[21] Appl. No.: 180,454

[22] Filed: Aug. 22, 1980

[30] Foreign Application Priority Data

Aug. 31, 1979 [JP] Japan .................. 54/111249

[51] Int. Cl.³ .................. G06F 9/00; G06F 5/00
[52] U.S. Cl. .................. 364/900
[58] Field of Search ... 364/200 MS File, 900 MS File; 235/92 SR; 377/54, 64, 69, 73

[56] References Cited

U.S. PATENT DOCUMENTS

| 3,274,556 | 9/1966 | Paul et al. | 364/900 |
|---|---|---|---|
| 3,510,846 | 5/1970 | Goldschmidt et al. | 364/900 |
| 3,747,070 | 7/1973 | Huttenhoff | 364/900 |
| 3,790,960 | 2/1974 | Amdahl et al. | 364/900 |
| 3,887,799 | 6/1975 | Lindgren | 364/900 |
| 3,914,744 | 10/1975 | Brown | 364/900 |
| 3,961,750 | 6/1976 | Dad | 364/900 |
| 3,969,704 | 7/1976 | Liebel, Jr. | 364/900 |
| 4,122,534 | 10/1978 | Cesaratto | 364/900 |
| 4,128,872 | 12/1978 | Prioste | 364/900 |
| 4,139,899 | 2/1979 | Tulpule et al. | 364/900 |
| 4,149,263 | 4/1979 | Prioste | 364/900 |
| 4,223,391 | 9/1980 | Barnes | 364/900 |
| 4,276,596 | 6/1981 | Flynn et al. | 364/200 |

*Primary Examiner*—Raulfe B. Zache
*Assistant Examiner*—Archie E. Williams
*Attorney, Agent, or Firm*—Staas & Halsey

[57] ABSTRACT

In a multichip shifter, input data is applied to a plurality of rotators which rotate the input data by $2^4$ bits. The outputs from the rotators are applied to selectors which select between the rotated outputs. The selected outputs are then shifted in shifters by from 0 to $2^4-1$ bits.

13 Claims, 22 Drawing Figures

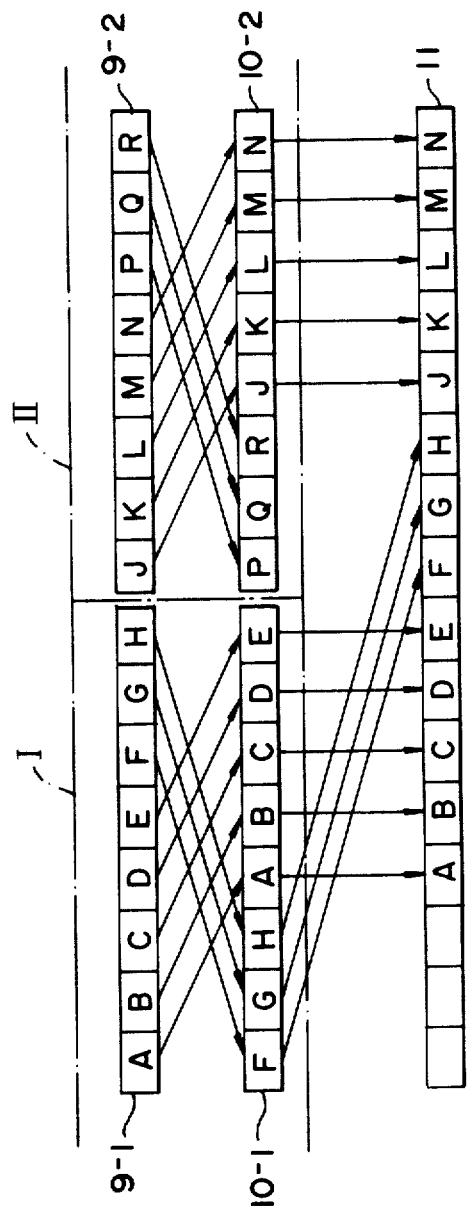
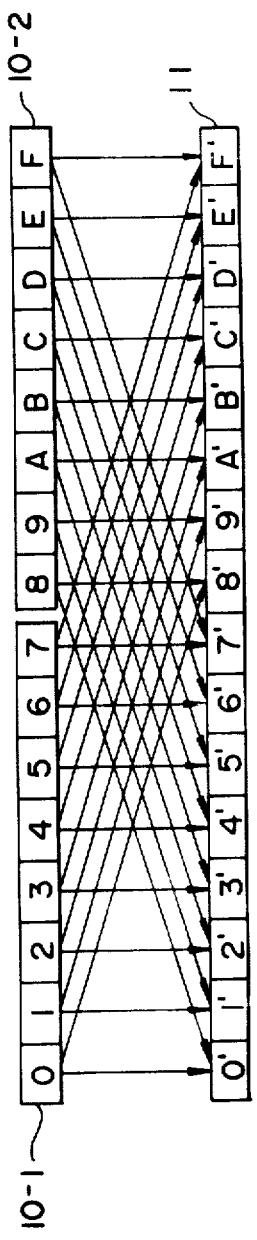
FIG. 3
FIG. 4

FIG. 5

| AMOUNT OF SHIFT | | | | DIRECTION OF SHIFT | 0 | 3 4 | 7 8 | 11 12 | 15 16 | 19 20 | 23 24 | 27 28 | 31 |
|---|---|---|---|---|---|---|---|---|---|---|---|---|---|
| 32 | 16 | 8 | 4 | | 0 | 1 | 2 | 3 | 4 | 5 | 6 | 7 | |
| 0 | 0 | 0 | 0 | RIGHT | 0 | 1 | 2 | 3 | 4 | 5 | 6 | 7 | |
| 0 | 0 | 0 | 1 | RIGHT | 7 | 0 | 1 | 2 | 3 | 4 | 5 | 6 | |
| 0 | 0 | 1 | 0 | RIGHT | 6 | 7 | 0 | 1 | 2 | 3 | 4 | 5 | |
| 0 | 0 | 1 | 1 | RIGHT | 5 | 6 | 7 | 0 | 1 | 2 | 3 | 4 | |
| 0 | 1 | 0 | 0 | RIGHT | 4 | 5 | 6 | 7 | 0 | 1 | 2 | 3 | |
| 0 | 1 | 0 | 1 | RIGHT | 3 | 4 | 5 | 6 | 7 | 0 | 1 | 2 | |
| 0 | 1 | 1 | 0 | RIGHT | 2 | 3 | 4 | 5 | 6 | 7 | 0 | 1 | |
| 0 | 1 | 1 | 1 | RIGHT | 1 | 2 | 3 | 4 | 5 | 6 | 7 | 0 | |
| 0 | 0 | 0 | 0 | LEFT | 0 | 1 | 2 | 3 | 4 | 5 | 6 | 7 | |
| 0 | 0 | 0 | 1 | LEFT | 1 | 2 | 3 | 4 | 5 | 6 | 7 | 0 | |
| 0 | 0 | 1 | 0 | LEFT | 2 | 3 | 4 | 5 | 6 | 7 | 0 | 1 | |
| 0 | 0 | 1 | 1 | LEFT | 3 | 4 | 5 | 6 | 7 | 0 | 1 | 2 | |
| 0 | 1 | 0 | 0 | LEFT | 4 | 5 | 6 | 7 | 0 | 1 | 2 | 3 | |
| 0 | 1 | 0 | 1 | LEFT | 5 | 6 | 7 | 0 | 1 | 2 | 3 | 4 | |
| 0 | 1 | 1 | 0 | LEFT | 6 | 7 | 0 | 1 | 2 | 3 | 4 | 5 | |
| 0 | 1 | 1 | 1 | LEFT | 7 | 0 | 1 | 2 | 3 | 4 | 5 | 6 | |

FIG. 6

| STAGE I' 4BIT GROUP NO | | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|
| RIGHT SHIFT | 0~3 | 0 | 1 | 2 | 3 | 4 | 5 | 6 | 7 | 8 | 9 | A | B | C | D | E | F |
| | 4~7 | | 1 | 2 | 3 | 4 | 5 | 6 | 7 | 0 | 9 | A | B | C | D | E | F |
| | 8~11 | | | 2 | 3 | 4 | 5 | 6 | 7 | 0 | 1 | A | B | C | D | E | F |
| | 12~15 | | | | 3 | 4 | 5 | 6 | 7 | 0 | 1 | 2 | B | C | D | E | F |
| | 16~19 | | | | | 4 | 5 | 6 | 7 | 0 | 1 | 2 | 3 | C | D | E | F |
| | 20~23 | | | | | | 5 | 6 | 7 | 0 | 1 | 2 | 3 | 4 | D | E | F |
| | 24~27 | | | | | | | 6 | 7 | 0 | 1 | 2 | 3 | 4 | 5 | E | F |
| | 28~31 | | | | | | | | 7 | 0 | 1 | 2 | 3 | 4 | 5 | 6 | F |
| | 32~35 | | | | | | | | | 0 | 1 | 2 | 3 | 4 | 5 | 6 | 7 |
| | 36~39 | | | | | | | | | | 1 | 2 | 3 | 4 | 5 | 6 | 7 |
| | 40~43 | | | | | | | | | | | 2 | 3 | 4 | 5 | 6 | 7 |
| | 44~47 | | | | | | | | | | | | 3 | 4 | 5 | 6 | 7 |
| | 48~51 | | | | | | | | | | | | | 4 | 5 | 6 | 7 |
| | 52~55 | | | | | | | | | | | | | | 5 | 6 | 7 |
| | 56~59 | | | | | | | | | | | | | | | 6 | 7 |
| | 60~63 | | | | | | | | | | | | | | | | 7 |
| LEFT SHIFT | 0~3 | 0 | 1 | 2 | 3 | 4 | 5 | 6 | 7 | 8 | 9 | A | B | C | D | E | F |
| | 4~7 | 0 | 1 | 2 | 3 | 4 | 5 | 6 | F | 8 | 9 | A | B | C | D | E | |
| | 8~11 | 0 | 1 | 2 | 3 | 4 | 5 | E | F | 8 | 9 | A | B | C | D | | |
| | 12~15 | 0 | 1 | 2 | 3 | 4 | D | E | F | 8 | 9 | A | B | C | | | |
| | 16~19 | 0 | 1 | 2 | 3 | C | D | E | F | 8 | 9 | A | B | | | | |
| | 20~23 | 0 | 1 | 2 | B | C | D | E | F | 8 | 9 | A | | | | | |
| | 24~27 | 0 | 1 | A | B | C | D | E | F | 8 | 9 | | | | | | |
| | 28~31 | 0 | 9 | A | B | C | D | E | F | 8 | | | | | | | |
| | 32~35 | 8 | 9 | A | B | C | D | E | F | | | | | | | | |
| | 36~39 | 8 | 9 | A | B | C | D | E | | | | | | | | | |
| | 40~43 | 8 | 9 | A | B | C | D | | | | | | | | | | |
| | 44~47 | 8 | 9 | A | B | C | | | | | | | | | | | |
| | 48~51 | 8 | 9 | A | B | | | | | | | | | | | | |
| | 52~55 | 8 | 9 | A | | | | | | | | | | | | | |
| | 56~59 | 8 | 9 | | | | | | | | | | | | | | |
| | 60~63 | 8 | | | | | | | | | | | | | | | |

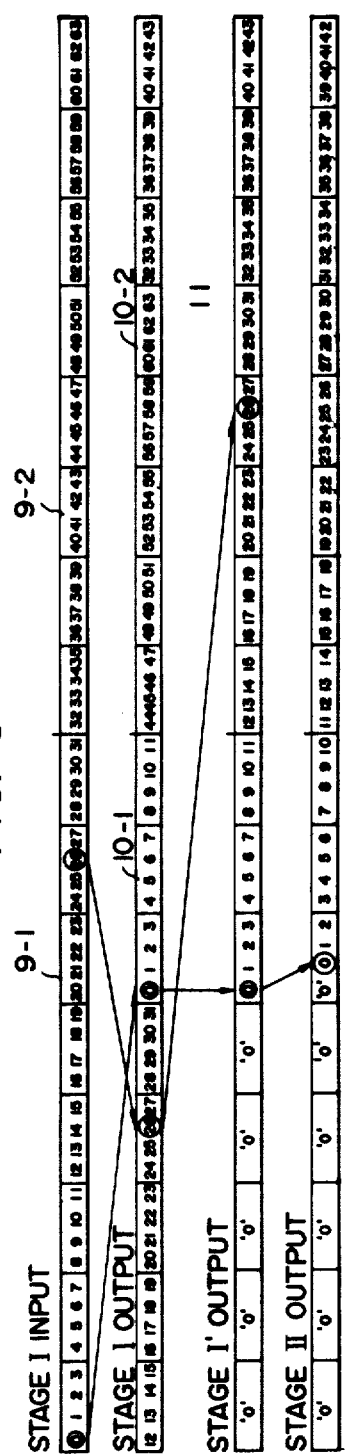
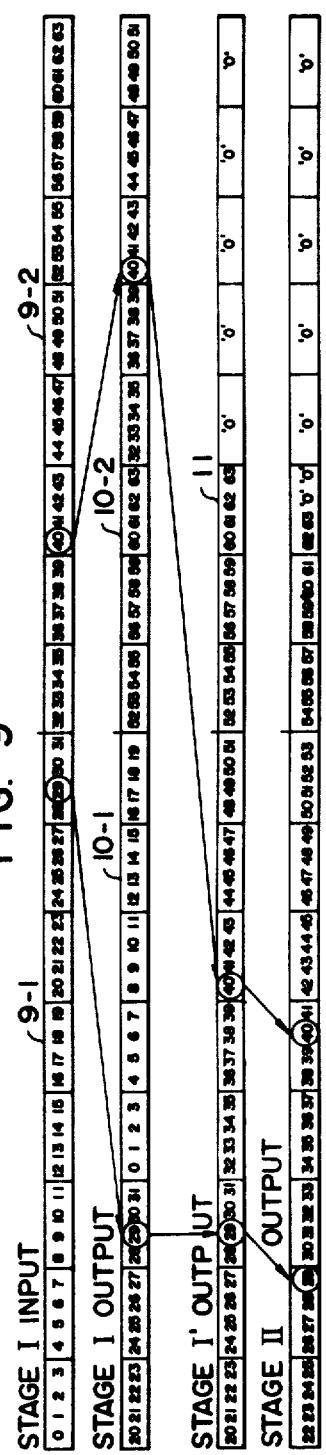
FIG. 8
FIG. 9

FIG. 16

| AMOUNT OF SHIFT | | | | DIRECTION OF SHIFT | 0 | 1 | 2 | 3 | 4 | 5 | 6 | 7 |
| 32 | 16 | 8 | 4 | | 0 3 4 | 7 8 | 11 12 | 15 16 | 19 20 | 23 24 | 27 28 | 31 |
|---|---|---|---|---|---|---|---|---|---|---|---|---|
| 0 | 0 | 0 | 0 | RIGHT | 0 | 1 | 2 | 3 | 4 | 5 | 6 | 7 |
| 0 | 0 | 0 | 1 | RIGHT | 7 | 0 | 1 | 2 | 3 | 4 | 5 | 6 |
| 0 | 0 | 1 | 0 | RIGHT | 6 | 7 | 0 | 1 | 2 | 3 | 4 | 5 |
| 0 | 0 | 1 | 1 | RIGHT | 5 | 6 | 7 | 0 | 1 | 2 | 3 | 4 |
| 0 | 1 | 0 | 0 | RIGHT | 4 | 5 | 6 | 7 | 0 | 1 | 2 | 3 |
| 0 | 1 | 0 | 1 | RIGHT | 3 | 4 | 5 | 6 | 7 | 0 | 1 | 2 |
| 0 | 1 | 1 | 0 | RIGHT | 2 | 3 | 4 | 5 | 6 | 7 | 0 | 1 |
| 0 | 1 | 1 | 1 | RIGHT | 1 | 2 | 3 | 4 | 5 | 6 | 7 | 0 |
| 0 | 0 | 0 | 0 | LEFT | 1 | 2 | 3 | 4 | 5 | 6 | 7 | 0 |
| 0 | 0 | 0 | 1 | LEFT | 2 | 3 | 4 | 5 | 6 | 7 | 0 | 1 |
| 0 | 0 | 1 | 0 | LEFT | 3 | 4 | 5 | 6 | 7 | 0 | 1 | 2 |
| 0 | 0 | 1 | 1 | LEFT | 4 | 5 | 6 | 7 | 0 | 1 | 2 | 3 |
| 0 | 1 | 0 | 0 | LEFT | 5 | 6 | 7 | 0 | 1 | 2 | 3 | 4 |
| 0 | 1 | 0 | 1 | LEFT | 6 | 7 | 0 | 1 | 2 | 3 | 4 | 5 |
| 0 | 1 | 1 | 0 | LEFT | 7 | 0 | 1 | 2 | 3 | 4 | 5 | 6 |
| 0 | 1 | 1 | 1 | LEFT | 0 | 1 | 2 | 3 | 4 | 5 | 6 | 7 |

FIG. 18

| STAGE I' 4BIT GROUP NO | H | 0 | 1 | 2 | 3 | 4 | 5 | 6 | 7 | 8 | 9 | A | B | C | D | E | F |
|---|---|---|---|---|---|---|---|---|---|---|---|---|---|---|---|---|---|
| RIGHT SHIFT 0~3 | | 0 | 1 | 2 | 3 | 4 | 5 | 6 | 7 | 8 | 9 | A | B | C | D | E | F |
| 4~7 | | | 1 | 2 | 3 | 4 | 5 | 6 | 7 | 0 | 9 | A | B | C | D | E | F |
| 8~11 | | | | 2 | 3 | 4 | 5 | 6 | 7 | 0 | 1 | A | B | C | D | E | F |
| 12~15 | | | | | 3 | 4 | 5 | 6 | 7 | 0 | 1 | 2 | B | C | D | E | F |
| 16~19 | | | | | | 4 | 5 | 6 | 7 | 0 | 1 | 2 | 3 | C | D | E | F |
| 20~23 | | | | | | | 5 | 6 | 7 | 0 | 1 | 2 | 3 | 4 | D | E | F |
| 24~27 | | | | | | | | 6 | 7 | 0 | 1 | 2 | 3 | 4 | 5 | E | F |
| 28~31 | | | | | | | | | 7 | 0 | 1 | 2 | 3 | 4 | 5 | 6 | F |
| 32~35 | | | | | | | | | | 0 | 1 | 2 | 3 | 4 | 5 | 6 | 7 |
| 36~39 | | | | | | | | | | | 1 | 2 | 3 | 4 | 5 | 6 | 7 |
| 40~43 | | | | | | | | | | | | 2 | 3 | 4 | 5 | 6 | 7 |
| 44~47 | | | | | | | | | | | | | 3 | 4 | 5 | 6 | 7 |
| 48~51 | | | | | | | | | | | | | | 4 | 5 | 6 | 7 |
| 52~55 | | | | | | | | | | | | | | | 5 | 6 | 7 |
| 56~59 | | | | | | | | | | | | | | | | 6 | 7 |
| 60~63 | | | | | | | | | | | | | | | | | 7 |
| LEFT SHIFT 0~3 | 7 | 0 | 1 | 2 | 3 | 4 | 5 | 6 | | F | 8 | 9 | A | B | C | D | E |
| 4~7 | 7 | 0 | 1 | 2 | 3 | 4 | 5 | E | | F | 8 | 9 | A | B | C | D | |
| 8~11 | 7 | 0 | 1 | 2 | 3 | 4 | D | E | | F | 8 | 9 | A | B | C | | |
| 12~15 | 7 | 0 | 1 | 2 | 3 | C | D | E | | F | 8 | 9 | A | B | | | |
| 16~19 | 7 | 0 | 1 | 2 | B | C | D | E | | F | 8 | 9 | A | | | | |
| 20~23 | 7 | 0 | 1 | A | B | C | D | E | | F | 8 | 9 | | | | | |
| 24~27 | 7 | 0 | 9 | A | B | C | D | E | | F | 8 | | | | | | |
| 28~31 | 7 | 8 | 9 | A | B | C | D | E | | F | | | | | | | |
| 32~35 | F | 8 | 9 | A | B | C | D | E | | | | | | | | | |
| 36~39 | F | 8 | 9 | A | B | C | D | | | | | | | | | | |
| 40~43 | F | 8 | 9 | A | B | C | | | | | | | | | | | |
| 44~47 | F | 8 | 9 | A | B | | | | | | | | | | | | |
| 48~51 | F | 8 | 9 | A | | | | | | | | | | | | | |
| 52~55 | F | 8 | 9 | | | | | | | | | | | | | | |
| 56~59 | F | 8 | | | | | | | | | | | | | | | |
| 60~63 | F | | | | | | | | | | | | | | | | |

FIG. 19

| AMOUNT OF SHIFT | | | | DIRECTION OF SHIFT | 32 | 35 36 | 39 40 | 43 44 | 47 48 | 51 52 | 55 56 | 59 60 | 63 |
|---|---|---|---|---|---|---|---|---|---|---|---|---|---|
| | | | | | 8 | 9 | A | B | C | D | E | F | |
| 32 | 16 | 8 | 4 | | | | | | | | | | |
| 0 | 0 | 0 | 0 | RIGHT | F | 8 | 9 | A | B | C | D | E | |
| 0 | 0 | 0 | 1 | RIGHT | E | F | 8 | 9 | A | B | C | D | |
| 0 | 0 | 1 | 0 | RIGHT | D | E | F | 8 | 9 | A | B | C | |
| 0 | 0 | 1 | 1 | RIGHT | C | D | E | F | 8 | 9 | A | B | |
| 0 | 1 | 0 | 0 | RIGHT | B | C | D | E | F | 8 | 9 | A | |
| 0 | 1 | 0 | 1 | RIGHT | A | B | C | D | E | F | 8 | 9 | |
| 0 | 1 | 1 | 0 | RIGHT | 9 | A | B | C | D | E | F | 8 | |
| 0 | 1 | 1 | 1 | RIGHT | 8 | 9 | A | B | C | D | E | F | |
| 1 | 0 | 0 | 0 | LEFT | 8 | 9 | A | B | C | D | E | F | |
| 1 | 0 | 0 | 1 | LEFT | 9 | A | B | C | D | E | F | 8 | |
| 1 | 0 | 1 | 0 | LEFT | A | B | C | D | E | F | 8 | 9 | |
| 1 | 0 | 1 | 1 | LEFT | B | C | D | E | F | 8 | 9 | A | |
| 1 | 1 | 0 | 0 | LEFT | C | D | E | F | 8 | 9 | A | B | |
| 1 | 1 | 0 | 1 | LEFT | D | E | F | 8 | 9 | A | B | C | |
| 1 | 1 | 1 | 0 | LEFT | E | F | 8 | 9 | A | B | C | D | |
| 1 | 1 | 1 | 1 | LEFT | F | 8 | 9 | A | B | C | D | E | |

FIG. 20

| STRAGE 4BIT GROUP NO | | H | 0 | 1 | 2 | 3 | 4 | 5 | 6 | 7 | 8 | 9 | A | B | C | D | E | F | L |
|---|---|---|---|---|---|---|---|---|---|---|---|---|---|---|---|---|---|---|---|
| RIGHT SHIFT | 0 – 3 | | 0 | 1 | 2 | 3 | 4 | 5 | 6 | 7 | 7 | 9 | A | B | C | D | E | F | 8 |
| | 4 – 7 | | | 1 | 2 | 3 | 4 | 5 | 6 | 7 | 7 | 0 | A | B | C | D | E | F | 8 |
| | 8 – 11 | | | | 2 | 3 | 4 | 5 | 6 | 7 | 7 | 0 | 1 | B | C | D | E | F | 8 |
| | 12 – 15 | | | | | 3 | 4 | 5 | 6 | 7 | 7 | 0 | 1 | 2 | C | D | E | F | 8 |
| | 16 – 19 | | | | | | 4 | 5 | 6 | 7 | 7 | 0 | 1 | 2 | 3 | D | E | F | 8 |
| | 20 – 23 | | | | | | | 5 | 6 | 7 | 7 | 0 | 1 | 2 | 3 | 4 | E | F | 8 |
| | 24 – 27 | | | | | | | | 6 | 7 | 7 | 0 | 1 | 2 | 3 | 4 | 5 | F | 8 |
| | 28 – 31 | | | | | | | | | 7 | 7 | 0 | 1 | 2 | 3 | 4 | 5 | 6 | 8 |
| | 32 – 35 | | | | | | | | | | | 0 | 1 | 2 | 3 | 4 | 5 | 6 | 7 |
| | 36 – 39 | | | | | | | | | | | | 1 | 2 | 3 | 4 | 5 | 6 | 7 |
| | 40 – 43 | | | | | | | | | | | | | 2 | 3 | 4 | 5 | 6 | 7 |
| | 44 – 47 | | | | | | | | | | | | | | 3 | 4 | 5 | 6 | 7 |
| | 48 – 51 | | | | | | | | | | | | | | | 4 | 5 | 6 | 7 |
| | 52 – 55 | | | | | | | | | | | | | | | | 5 | 6 | 7 |
| | 56 – 59 | | | | | | | | | | | | | | | | | 6 | 7 |
| | 60 – 63 | | | | | | | | | | | | | | | | | | 7 |
| LEFT SHIFT | 0 – 3 | 7 | 0 | 1 | 2 | 3 | 4 | 5 | 6 | 8 | 8 | 9 | A | B | C | D | E | F | |
| | 4 – 7 | 7 | 0 | 1 | 2 | 3 | 4 | 5 | F | 8 | 8 | 9 | A | B | C | D | E | | |
| | 8 – 11 | 7 | 0 | 1 | 2 | 3 | 4 | E | F | 8 | 8 | 9 | A | B | C | D | | | |
| | 12 – 15 | 7 | 0 | 1 | 2 | 3 | D | E | F | 8 | 8 | 9 | A | B | C | | | | |
| | 16 – 19 | 7 | 0 | 1 | 2 | C | D | E | F | 8 | 8 | 9 | A | B | | | | | |
| | 20 – 23 | 7 | 0 | 1 | B | C | D | E | F | 8 | 8 | 9 | A | | | | | | |
| | 24 – 27 | 7 | 0 | A | B | C | D | E | F | 8 | 8 | 9 | | | | | | | |
| | 28 – 31 | 7 | 9 | A | B | C | D | E | F | 8 | 8 | | | | | | | | |
| | 32 – 35 | 8 | 9 | A | B | C | D | E | F | | | | | | | | | | |
| | 36 – 39 | 8 | 9 | A | B | C | D | E | | | | | | | | | | | |
| | 40 – 43 | 8 | 9 | A | B | C | D | | | | | | | | | | | | |
| | 44 – 47 | 8 | 9 | A | B | C | | | | | | | | | | | | | |
| | 48 – 51 | 8 | 9 | A | B | | | | | | | | | | | | | | |
| | 52 – 55 | 8 | 9 | A | | | | | | | | | | | | | | | |
| | 56 – 59 | 8 | 9 | | | | | | | | | | | | | | | | |
| | 60 – 63 | 8 | | | | | | | | | | | | | | | | | |

MULTICHIP DATA SHIFTING SYSTEM

BACKGROUND OF THE INVENTION

1. Field of the Invention

This invention relates to a shift system, and more particularly to a shift system in which input data is shifted by a multiple of $2^A$ and then by 0 to $2^A$-1.

2. Description of the Prior Art

In general, a data processor comprises a main memory 1, a memory control unit 2, an instruction control unit 3, an execution processing unit 4, a channel unit 5 and a console 6, as shown in FIG. 1. For one of the internal functions of the execution processing unit 4, a shift circuit is provided.

The shift circuit shifts input data, by a certain amount, to the right or left for output. For example, as shown in FIG. 2(a), data A to R applied to an input part 7 are shifted by three bits to the right for transfer to an output part 8, from which the shifted data are removed. At this time, three bits of the output data on the left hand side thereof are 0.

With this method, however, when the number of data bits is large, it is difficult to get the shift circuit on one chip and it is necessary to use a plurality of chips, for example, I and II as shown in FIG. 2(b). Consequently, an interface is required between the chips I and II, and an increase in the amount of data to be shifted causes a corresponding increase in the amount of data to be interfaced. In the case of FIG. 2(b), three interface lines F—F, G—G and H—H from an input part 7-1 to an output part 8-2 will be necessary. For example, when the data is shifted to right by eight bits an 8 bit interface is required between the chips for each to shift from the input part 7-1 to the output part 8-2; further, if taking into account the need for a left shift, too, 8 bit interface is needed between the chips for each in the left direction to shift from an input part 7-2 to an output part 8-1. In this way, depending on the amount of data shifted and the direction of shift, the number of data interface lines becomes very large and a large number of pins are required to be connected between the chips.

When the signals transmited to the output parts 8-1 and 8-2 are outputted as they are, a time lag, caused by the interface does not matter substantially. But when the data A to R are arranged in a 4-bit shift configuration and the data is shifted in a plurality of 4 bit stages, for example, when the data is shifted to the output parts 8-1 and 8-2 by steps of four bits first and then by one bit, the time lag caused by the interface based on a chip-to-chip interface cross in each stage causes a serious degradation of the processing speed.

In order to prevent the lowering of the processing speed resulting from the time lag, it is necessary to provide on the chip II another input part for receiving the data from F to R in the case of FIG. 2(b). Therefore, in this case, when taking into consideration the leftward shift and the contruction of the chips I and II the, inputting of all input data A to R to both of the chips I and II involves redundant gates and a lot of input-output pins on the chips.

SUMMARY OF THE INVENTION

It is an object of the present invention to provide a shift system which is free from the above-described defects of the prior art and which is designed to reduce the time loss resulting from a chip-to-chip interface cross.

Briefly stated, according to the present invention, in a shift system in which individual divided input data into which input data is divided are transmitted to a plurality of shift means for shifting the divided data, each shift means is provided with a plurality of data rotate parts for rotating the divided input data, an output select part for selectively outputting the outputs produced by the plurality of rotate parts and a shift part for shifting outputs produced by the output select part. The input data is rotated by a multiple of $2^A$ bits in the data rotate part and then shifted by 0 to $2^A$-1 bits in the shift part.

BRIEF DESCRIPTION OF THE DRAWINGS

FIG. 3 is a diagram illustrating the construction of the shift system of the present invention;

FIG. 4 is a diagram illustrating a state of an input to a select output part in the shift system of the present invention;

FIG. 5 is a diagram illustrating a shift operation in the shift system of the present invention;

FIG. 6 is a diagram illustrating the operation of the select output part in the shift system of the present invention;

FIG. 8 is a diagram illustrating a rightward shift in the first embodiment of FIG. 7;

FIG. 9 is a diagram illustrating a leftward shift in the first embodiment of FIG. 7;

FIG. 16 is a diagram illustrating the amount of rotational shift in the case of shifting data to left in a stage I and to the right in a stage II;

FIG. 18 is a diagram illustrating a select operation in the second embodiment of the shift system of the present invention;

FIG. 19 is a diagram illustrating the amounts of rotational shift in a third embodiment of the shift system of the present invention;

FIG. 20 is a diagram illustrating the select operation of the select output part in the third embodiment of the shift system of the present invention;

DESCRIPTION OF THE PREFERRED EMBODIMENTS

Figure 1:
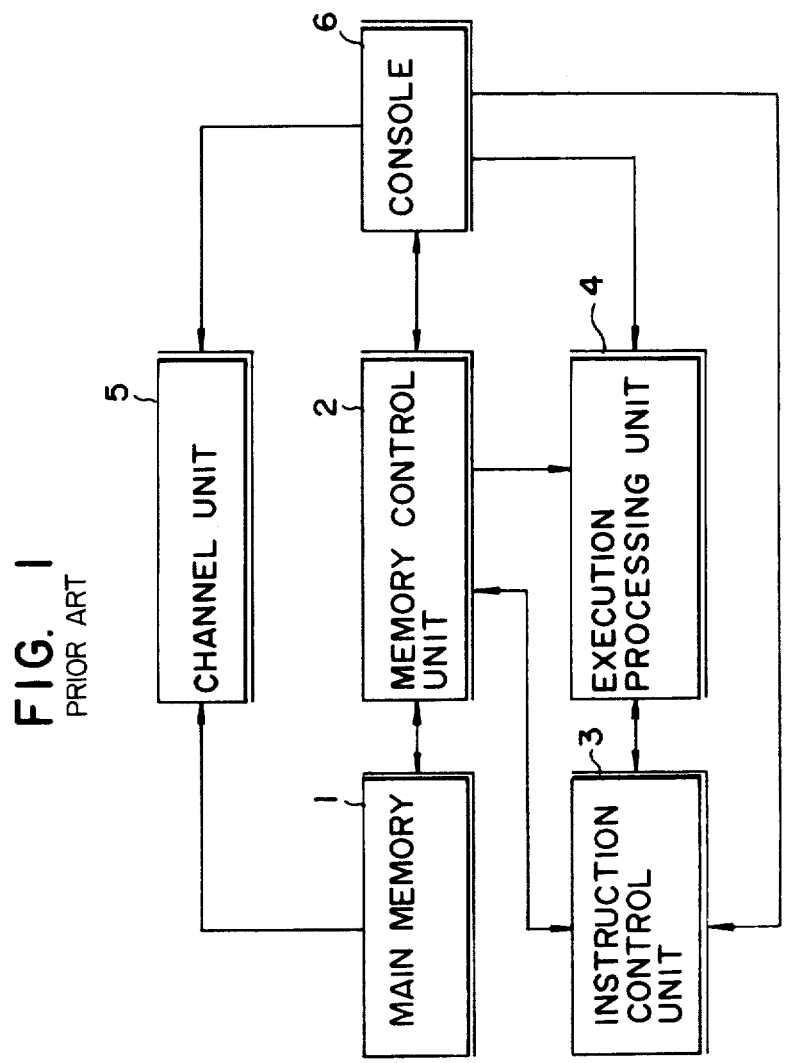
FIG. 1 is a block diagram illustrating the arrangement of a general data processing unit.
Figure 2:
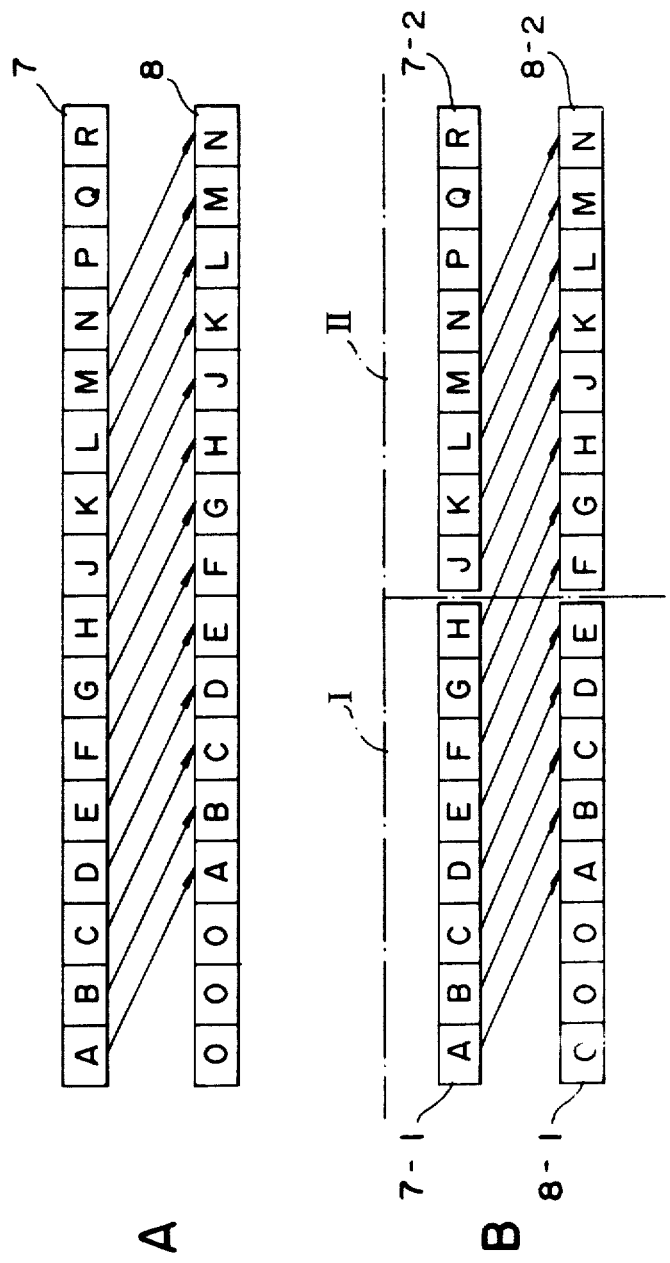
FIG. 2, consisting of a and b, is a diagram illustrating the construction of a conventional shift circuit.

In the following description, reference numerals 9-1 and 9-2 indicate input parts; 10-1 and 10-2 designate rotate output part; 11 identifies a select output part; 12-1 and 12-2 denote rotate parts; 13-1 and 13-2 represent shift control parts; 14-1 and 14-2 show select parts; 15-1 and 15-2 refer to partitions of the select parts; 16-1 and 16-2 incidate shift parts; 17-1 and 17-2 designate second shift parts; and reference characters CI to CIV identify LSI chips.

A description will be given, with reference to FIG. 3, of the outline of the shift system of the present invention. The input data A to R are entered in the input parts 9-1 and 9-2 in a state as shown.

(1) When the data A to R each has a 1-bit configuration.

A description will be given first in connection with the case of shifting the data A to R to the right by three bits.

At first, the input data in the input part 9-1 are rotated to right by three bits for output to the rotate output part 10-1 and the input data in the input part 9-2 are rotated to right by three bits for output to the rotate output part 10-2. As a consequence, the data shown in FIG. 3 are transferred to the rotate output parts 10-1 and 10-2. The data thus transferred to the rotate output parts 10-1 and 10-2 are output to the select output part 11, as indicated by the arrows. That is, the data A to E and J to N of the data transferred to the rotate output parts 10-1 and 10-2 are output to the data partitions right below them in FIG. 3, but the data F, G and H in the rotate output part 10-1 are output to the data partitions corresponding to those partitions of the rotate output part 10-2 into which the data P to R are transferred.

In this case, the select output part 11 is arranged so that each partition selectively receives one of two inputs indicated by arrows in FIG. 4. For example, a partition 0' of the select output part 11 is selectively supplied with data transmitted from a partition 0 of the rotate output part 10-1 or a partition 8 of the rotate output part 10-2. To a partition F' of the select output part 11 is selectively output data transmitted from a partition 7 of the rotate output part 10-1 or a partition F of the rotate output part 10-2. Accordingly, by selectively outputting data to partitions 8', 9' and A' of the select output part 11 from the partitions 0, 1 and 2 of the rotate output part 10-1 and by selectively outputting data to partitions 3' to 7' and B' to F' of the select output part 11 from those partitions of the rotate output parts 10-1 and 10-2 which are positioned just above them, the input data entered in the input parts 9-1 and 9-2 in FIG. 3 can be output in a state as shown in the select output part 11 in which the data have been shifted to right by three bits.

In this case, since no data transfer takes place between the chips I and II, data transmission can be achieved at high speed. A chip-to-chip interface cross occurs between some partitions of the select output part 11 and some partitions of the rotate output part 10-1, but in this case it is sufficient for the select part 11 to perform only a select operation and its control is very easy unlike the case of a shift operation.

(2) When the data A to R each has a 4-bit configuration.

The above description has been given for the case where each partition is 1-bit so as to facilitate a better understanding of the present invention. When each partition is 4-bits, the shift is carried out in the manner described below.

In this case, since the movement of one partition of the abovesaid rotate output part corresponds to the movement of four bits, the input data is rotated by a multiple of 4 first and then the resulting outputs are selected and shifted by 0 to 3 bits. The amount of rotation and the select means are shown in FIGS. 5 and 6 respectively.

This will hereinbelow be described in connection with a specific operative example, in which the data are shifted to the right by 21 bits. As shown in FIG. 3, the input parts 9-1 and 9-2 have entered therein bits numbered 0 to 63. In order to shift the data to the rights by 21 bits, the data are shifted to right by 20 bits; i.e. a multiple of 4, and then further shifted to the right by one bit. Accordingly, for shifting the data to right by 20 bits, it is necessary to rotationally-shift the data five times; the resulting pattern in the rotate output part 10-1 is shown in FIG. 8 and the status of this shift is shown by the item indicated by an amount of shift 20 (0101 in the binary code) in FIG. 5 in which groups of four bits are sequentially represented by "0", "1", ... "7". The result is such as shown in the rotate output parts 10-1 and 10-2 labelled "Stage I Output" in FIG. 8. It is shown in FIG. 6 which partitions of the rotate part outputs 10-1 and 10-2 are selected, as a Stage I' output, by the select output part 11. Therefore, when the selection indicated in FIG. 6 is made and the amount of rotational shift is 21 bits, data in partitions 5, 6, 7 and D, E and F of the rotate output parts 10-1 and 10-2 are output, as they are, to partitions 5, 6 and 7 and D, E and F (corresponding to 4-bit groups No. 5, 6 and 7 and D, E and F of stage I' shown in FIG. 6) of the select part output. To partitions 8, 9, A, B and C (corresponding to 4-bit groups No. 8, 9, A, B and C of stage I' shown in FIG. 6), however, are output data in partitions 0, 1, 2, 3 and 4 of the rotate part output 10-1. As a result of this, the data in the select output part becomes such as shown in FIG. 8, in which the data have been shifted to right by 20 bits. By further shifting the data to right by one bit into the stage II output, there can be obtained an output in which the input data have been shifted to right by 21 bits.

A description will be given, with reference to FIG. 9, of shifting the input data to left by 22 bits.

The data input into the input parts 9-1 and 9-2 are shifted to left by 20 bits, that is, rotationally-shifted by an amount of leftward rotation of five partitions in accordance with the table of FIG. 5, by which the data are put into such a state as shown in the rotate output parts 10-1 and 10-2. Then, the selective outputting shown in 20-23 item of a 22-bit left shift in FIG. 6 is carried out by the select output part 11. As a result, partitions 0, 1 and 2 and 8, 9 and A of the select output part 11 output data from partitions 0, 1 and 2 and 8, 9 and A of the rotate part 10-1 and 10-2 as they are. On the other hand, partitions 3, 4, 5, 6 and 7 of the select output part 11 output data from partitions B, C, D, E and F of the rotate part output 10-2. As a consequence, there are transferred to the select output part 11 the input data in the state in which they have been shifted to left by 20 bits, as shown in stage I' output in FIG. 9. By further shifting the data to left by two bits, the input data can be shifted to the left by 22 bits, as shown in stage II output.

Figure 7:
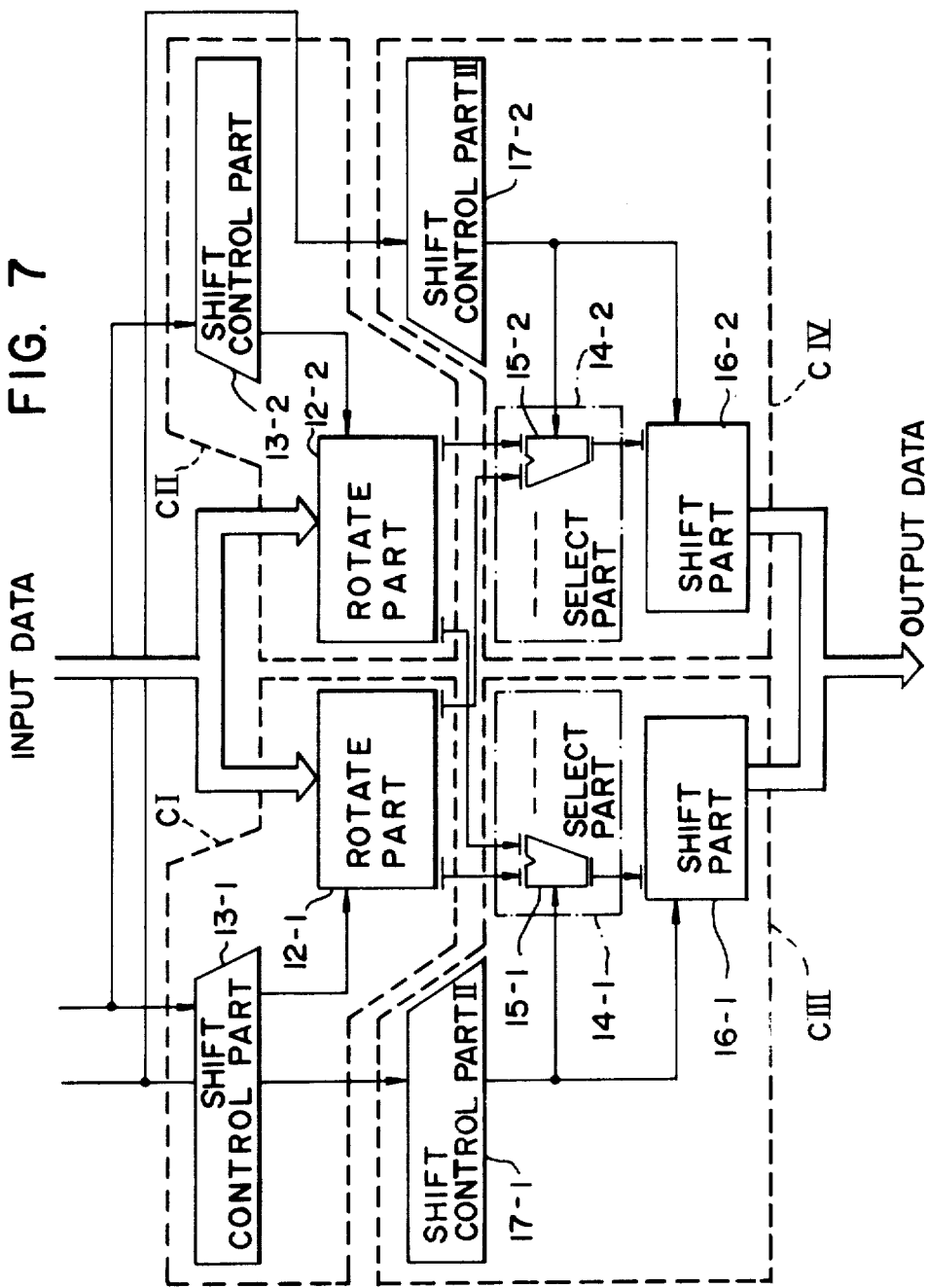
FIG. 7 is a block diagram illustrating a first embodiment of the shift system of the present invention.

Such input data shift control can be performed by a shift device in FIG. 7.

Included in the rotate part 12-1 are the input part 9-1 and the rotate output part 10-1, whereas included in the rotate part 12-2 are the input part 9-2 and the rotate output part 10-2. The shift control part 13-1 controls the rotate part 12-1 in such a manner as to rotationally-shift the input data in the input part 9-1 in accordance with the direction of shift and the amount of shift. The shift control part 13-2 performs a control operation similar to that of the shift control part 13-1.

Included in the select parts 14-1 and 14-2 are select output parts 11. The shift parts 16-1 and 16-2 are to shift the data by 0 to 3 bits which are insufficient with the 4-bit rotation by the rotate parts 12-1 and 12-2. The second shift control part 17-1 controls each partition of the select output part 11 in the select part 14-1 (which partition is shown by 15-1 in FIG. 7) in accordance with the direction of shift and the amount of shift indicated in FIG. 6 and controls the shift part 16-1 for a right or left shift of 0 to 3 bits in accordance with the amount of shift. The second shift control part 17-2 is identical in construction with the shift control part 17-1. In this way, such a predetermined shift as, for example, in FIGS. 8 and 9 is carried out.

Figure 10:
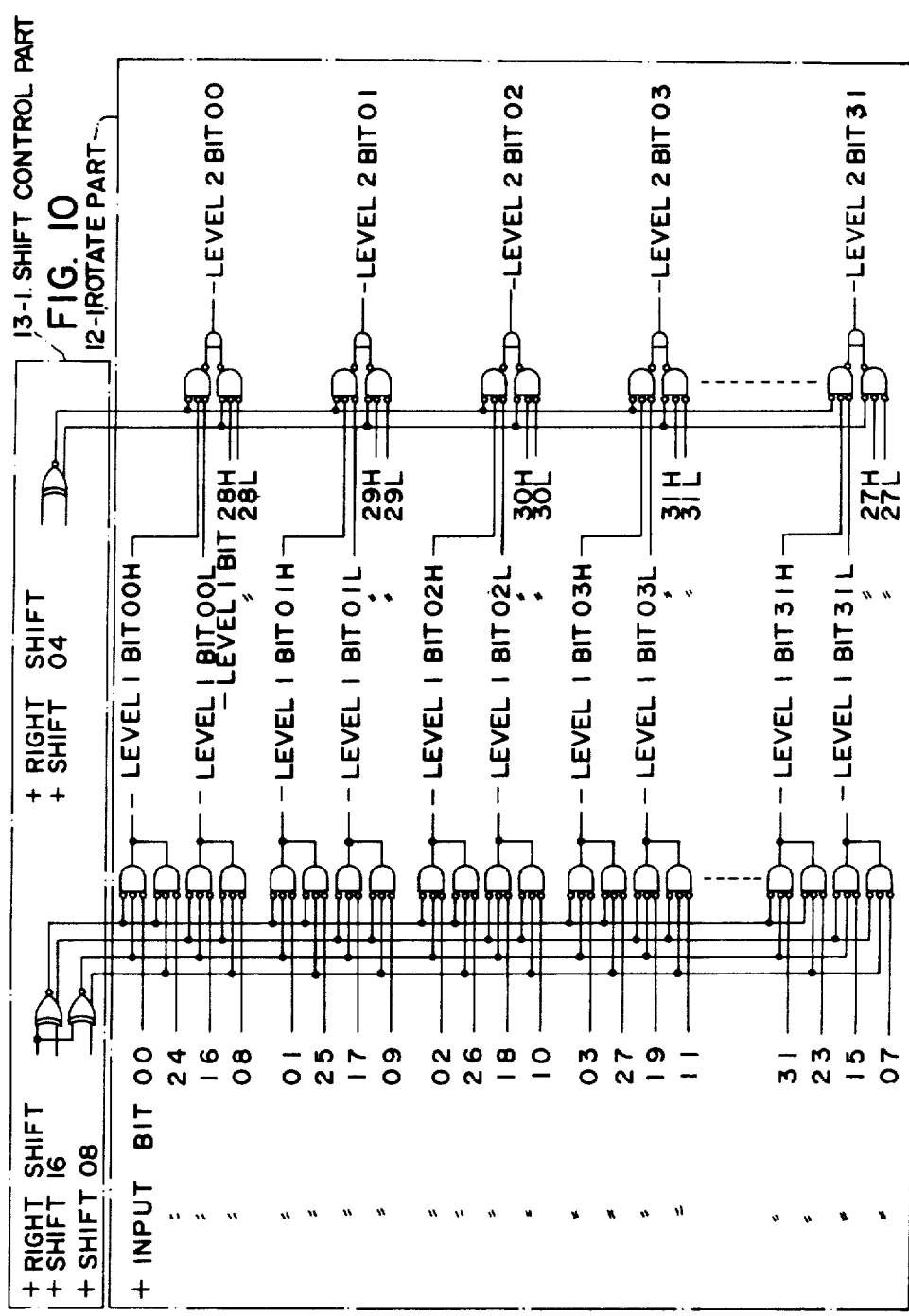
FIG. 10 is a detailed circuit diagram illustrating examples of the construction of a data rotate part 12-1 and a shift control part 13-1.
Figure 11:
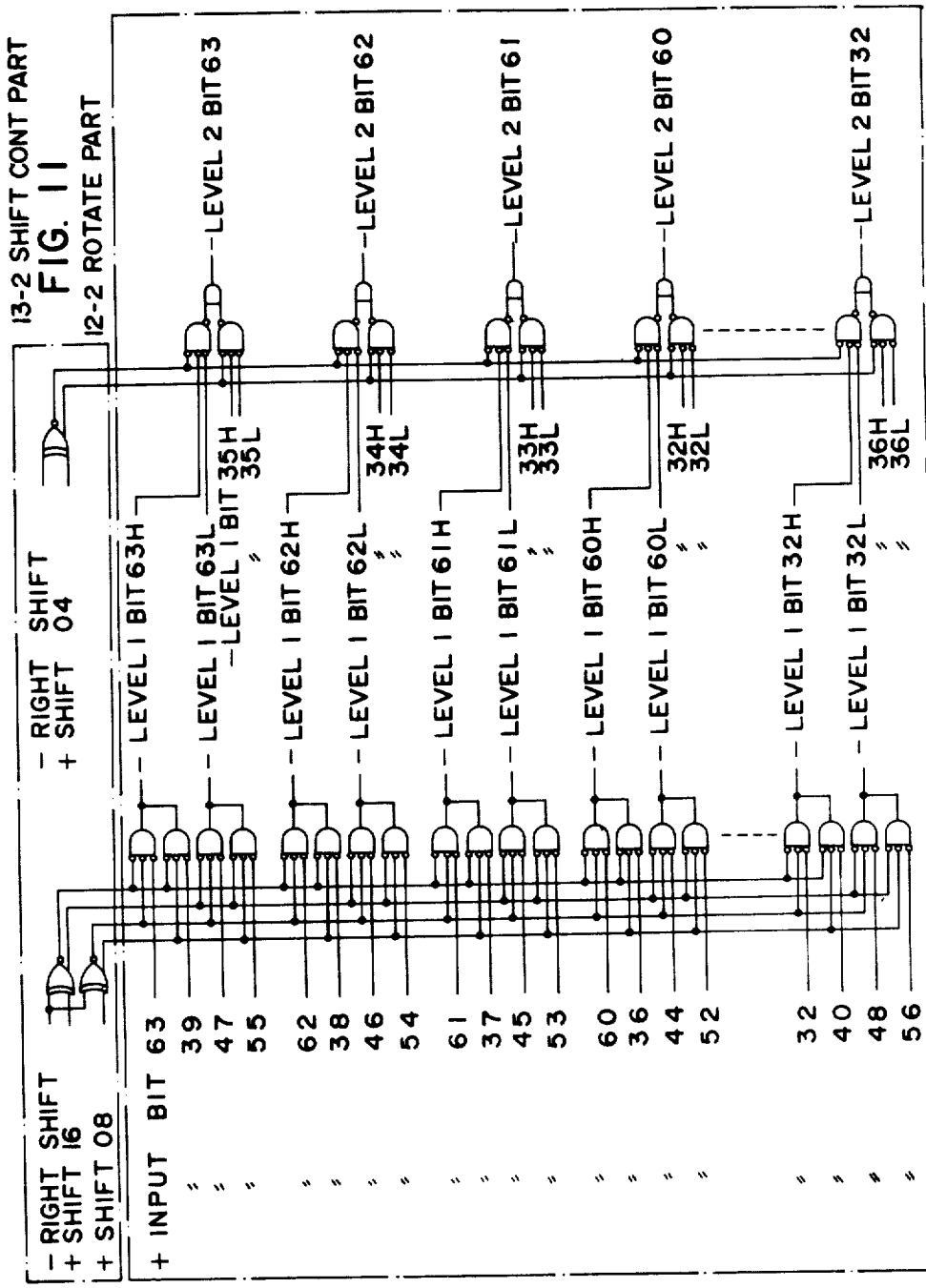
FIG. 11 is a detailed circuit diagram illustrating examples of the construction of a data rotate part 12-2 and a shift control part 13-2.
Figure 12:
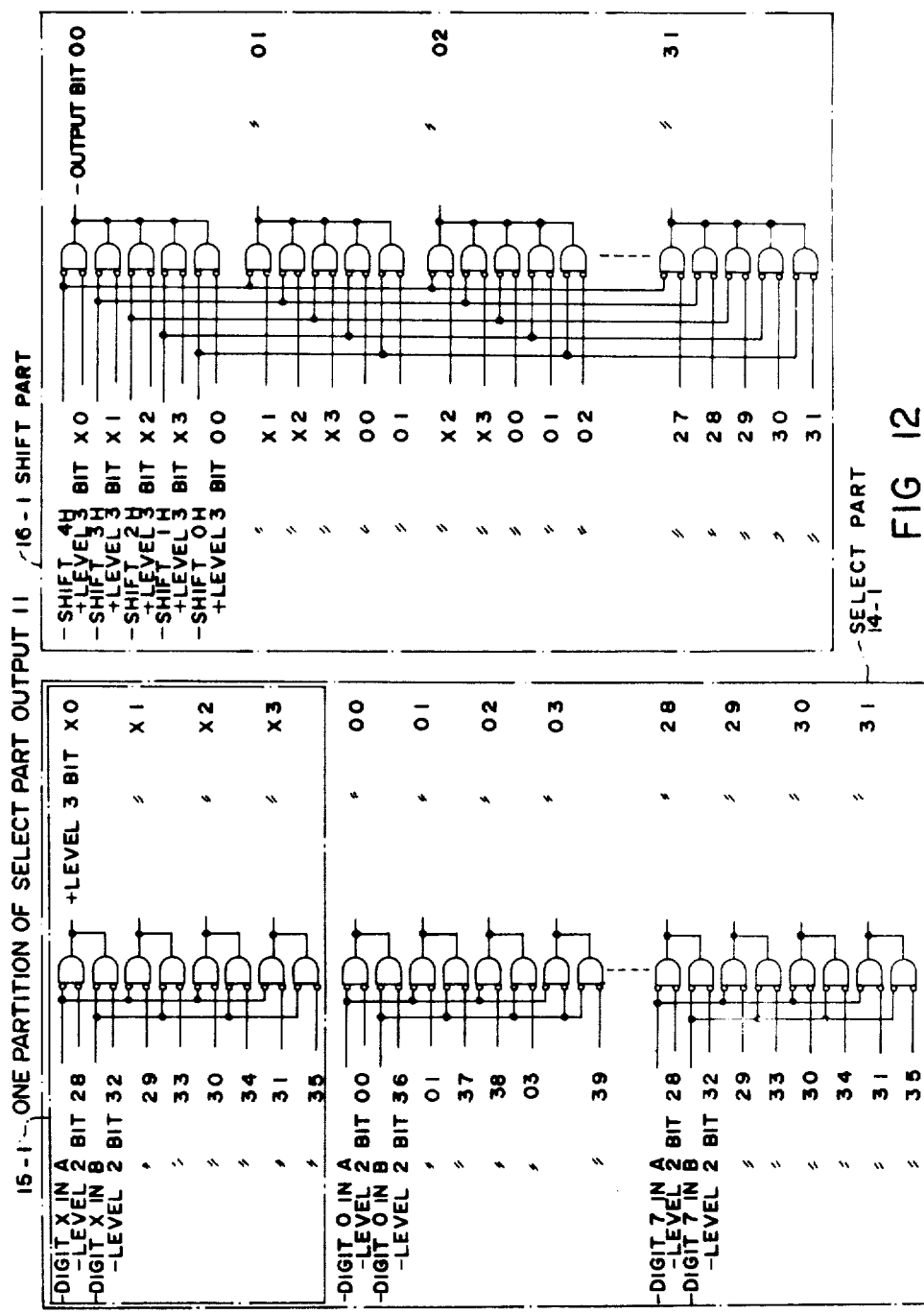
FIG. 12 is a detailed circuit diagram illustrating examples of the construction of an output select part 14-1, a partition 15-1 of a select output part 11 and a shift part 16-1.
Figure 13:
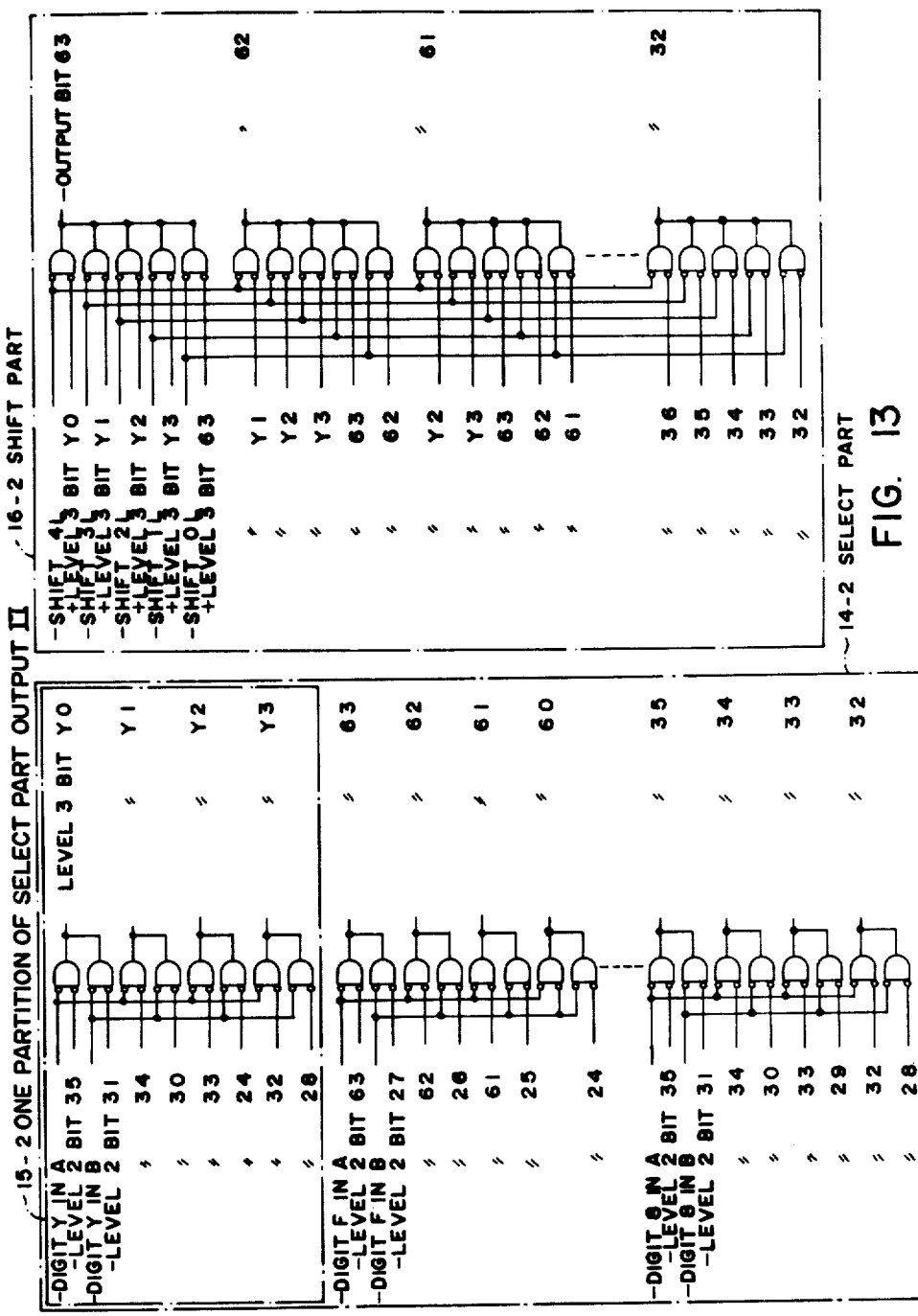
FIG. 13 is a detailed circuit diagram illustrating examples of the construction of a select part 14-2, a partition 15-2 of the output select output part 11 and the shift part 16-1.
Figure 14:
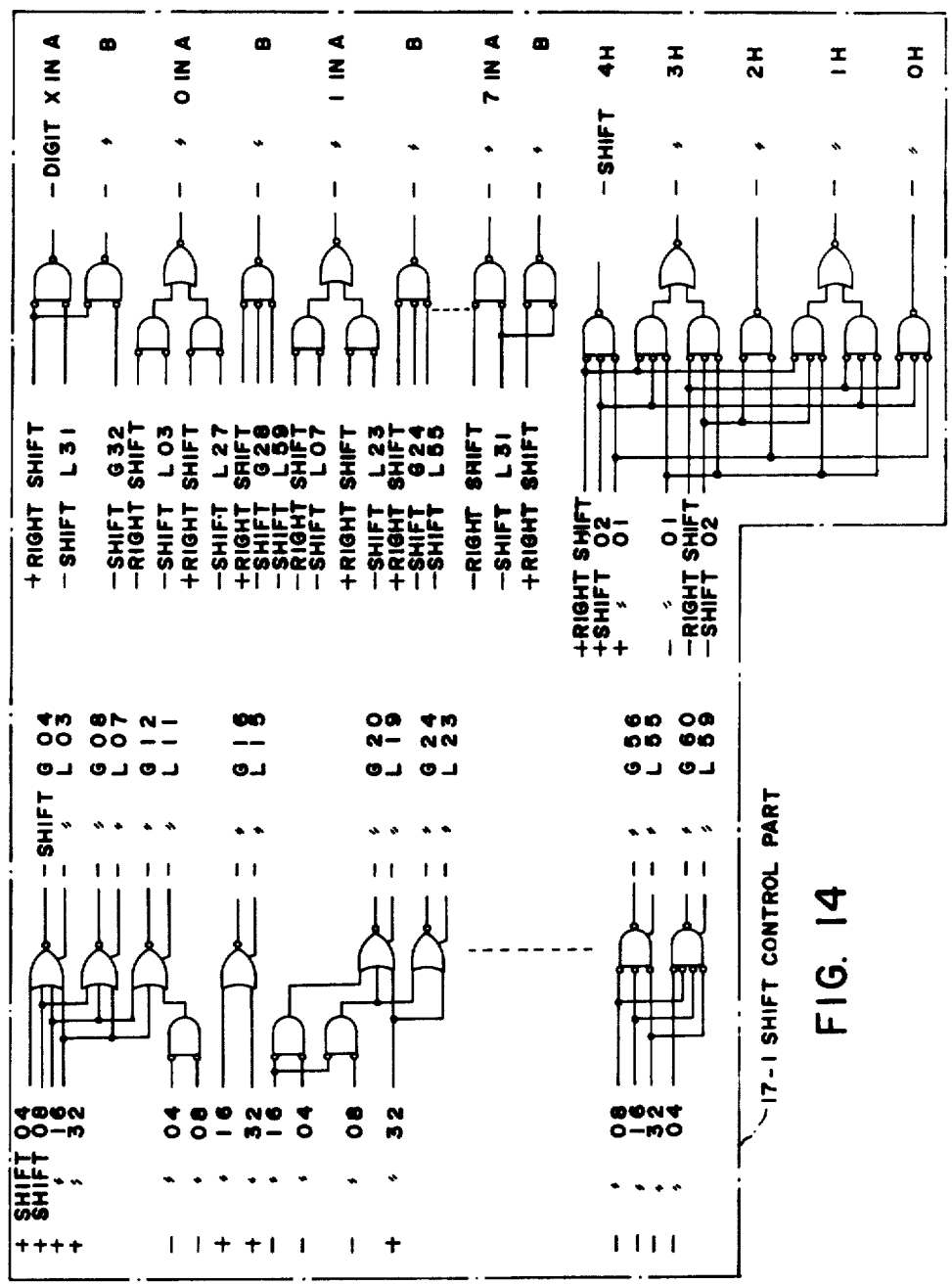
FIG. 14 is a detailed circuit diagram illustrating an example of the construction of a shift control part.
Figure 15:
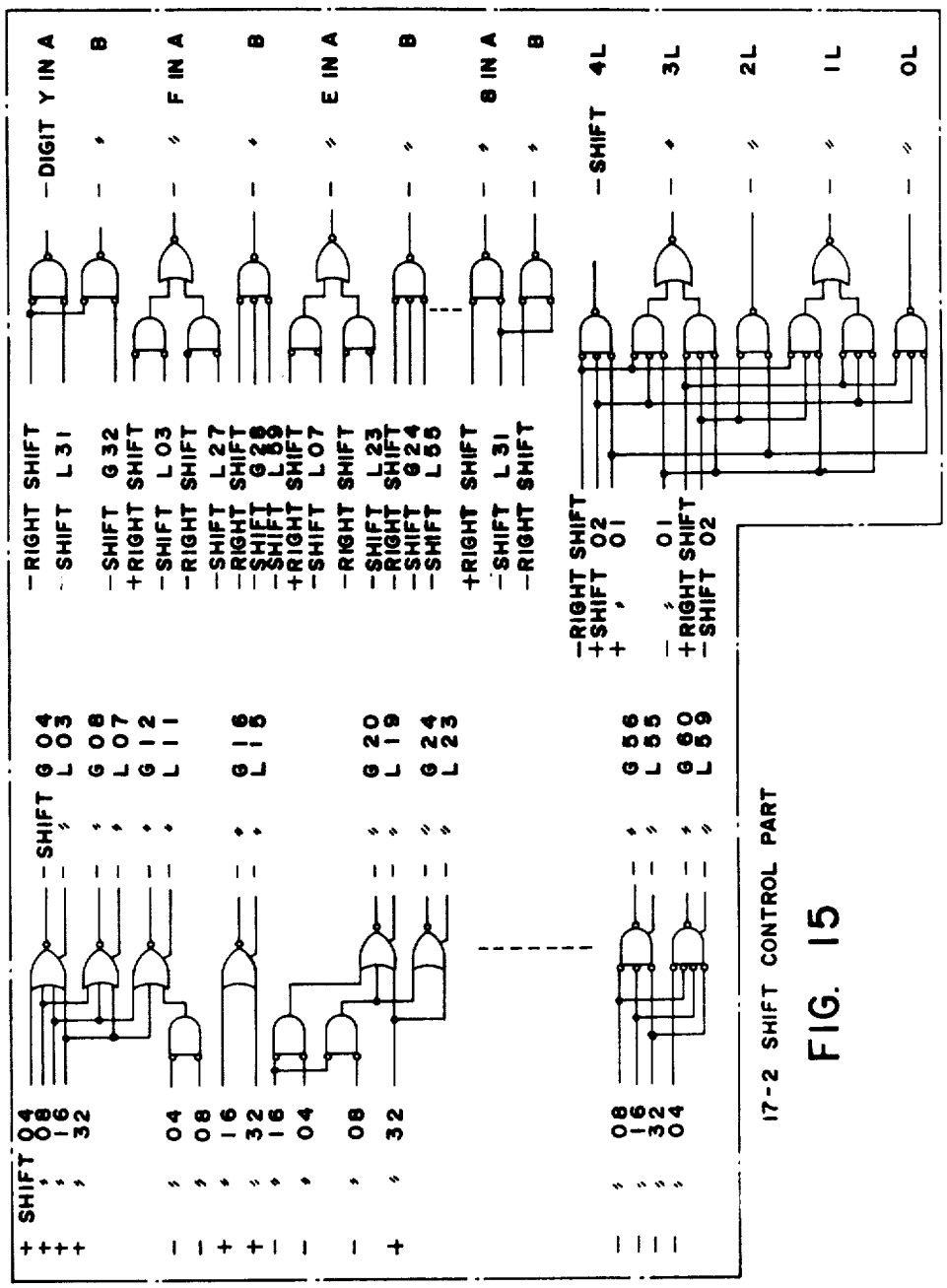
FIG. 15 is a detailed circuit diagram illustrating an example of a shift control part 17-2.

An example of the detailed construction of each part of the shift device shown in FIG. 7 is illustrated in FIGS. 10 to 15 in which parts corresponding to those in FIG. 7 are identified by the same reference nemerals. FIG. 10 illustrates in detail examples of the arrangements of the rotate part 12-1 and the shift control part 13-1, and FIG. 11 shows in detail examples of the arrangements of the rotate part 12-2 and the shift control part 13-2. Similarly, FIG. 12 illustrates in detail examples of the arrangements of the partition 15-1 of the select output part 11 and the shift part 16-1, FIG. 13 illustrates examples of the arrangements of the select part 14-2 and a partition 15-2 of the select part 14-2, FIG. 14 illustrates an example of the arrangement of the shift control part 17-1, and FIG. 15 an example of the arrangement of the shift control part 17-2.

In the example of FIG. 7, the rotate part 12-1 and the shift control part 13-1 comprise an LSI chip CI; the rotate part 12-2 and the shift control part 13-2 are constituted by the LSI chip CII; the select part 14-1, the shift part 16-1 and the second shift control part 17-1 comprise on LSI chip CIII; and the control part 14-2, the shift part 16-2 and the second shift control part 17-2 comprise an LSI chip CIV. In this case, it is possible to use the same LSI chips as those CI and CII and the same LSI chips as those CIII and CIV.

In the above example, as described previously in conjunction with FIGS. 8 and 9, the shift by 0 to 3 bits in stage II must be performed by a shift part capable of both right and left shifts. If however, the shift in stage II can be limited only to the right or left shift, then it is possible to greatly reduce the number of gates making up the shift part.

In order to restrict the shift in the stage II to the right shift alone, it is sufficient to rotate the data to the left by four more bits when shifting the data to left in stage II. In other words, when the data are shifted to the left by 22 bits, the data are rotated to left by 24 bits in stage I and then shifted to the right by two bits in stage II.

The amounts of rotate-shift in this case are shown in FIG. 16. As is apparent from FIG. 16, the shift operation for a right shift 0(32) is identical with the shift operation for a left shift 28(60) and the shift operation for a right shift 4(36) is identical with the shift operation for a left shift 24(56). The same is true of the other shift operations. Furthermore, it appears that except for a weight bit 32 in the amount of shift represented by the binary code, (the weight bit 32 has no affect on the rotate operation, and the right shift 0 and the right shift 32 are identical with each other.), the left shift operation is identical with the right shift operation which takes a 1's complement of the amount of shift with weights 16, 8 and 4. This greatly facilitates decoding of the amount of shift in the shift operation of the rotate part and reduces the time for the decoding.

Figure 17:
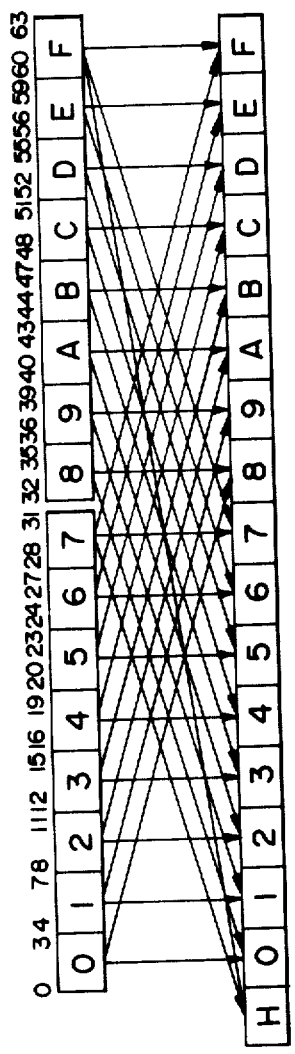
FIG. 17 is a diagram illustrating the select output parts in a second embodiment of the shift system of the present invention.

To perform this, the output status of the stage I' requires an extra select output part represented by a partition H, as shown in FIG. 17. This select output part is to select either one of the partitions 7 and F of the rotate output part, and the selection made by the select output part including it, in FIG. 17, is as illustrated in FIG. 18.

It is also possible to arrange the shift part to shift data of the higher-order half of the input data to right only and shift data of the lower-order half of the input data to left only. Letting the amount of shift S be represented by $S = P \times 2^A + Q$ where A, P and Q are integers greater than 1, the right and the left shift can be achieved in the following manner:

(1) Right shift

In the rotate part supplied with the data of the higher-order half of the input data, the data is rotationally-shifted to the right by $P \times 2^A$ and then shifted to the right by Q in the shift part. The data of the lower-order half of the input data is rotate-shifted by $(P-1) \cdot 2^A$ in the rotate part supplied with the data and then shifted by $2^A - Q$ in the shift part.

(2) Left Shift

In the rotate part supplied with the data of the higher-order half of the input data, the data is rotated to the left by $(P+1) \times 2^A$ and then shifted to right by $2^A - Q$ in the shift part. In the rotate part supplied with the data of the lower-order half of the input data, the data is rotated to the left by $P \times 2^A$ and then shifted to the left by Q in the shift part.

The operation of the rotate part supplied with the data of the higher-order half of the input data is identical in the case of FIG. 16 and the operation of the rotate part supplied with the data of the lower-order half of the input data.

Figure 21:
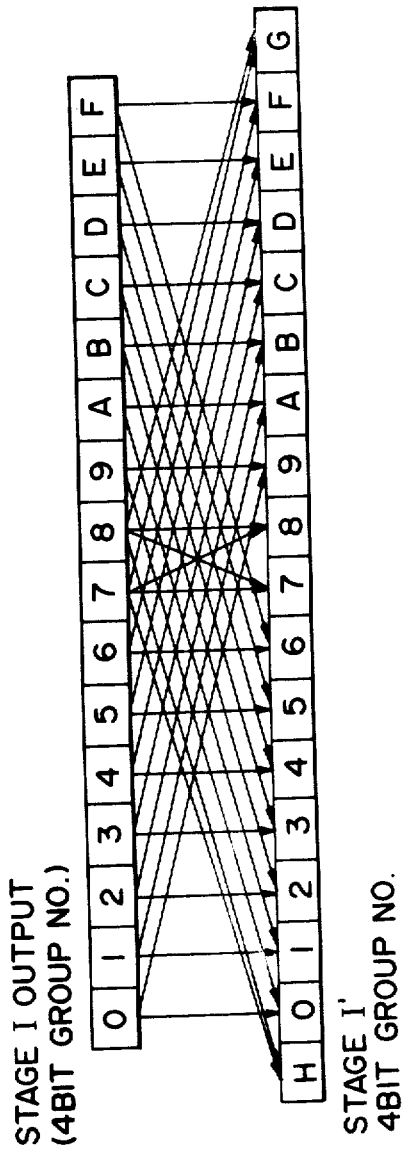
FIG. 21 is a diagram illustrating the state of an input to the select output part in the third embodiment of the shift system of the present invention.

In this case, the arrangement of the select output part is such as shown in FIG. 21, in which the select output part on the side of the lower-order half of the input data is larger than in the case of FIG. 12 by one partition, that is, a partition G. The output select mode of this select part output is such as shown in FIG. 20. Now, a description will be given, with reference to FIG. 22, of a 13-bit right shift.

Figure 22:
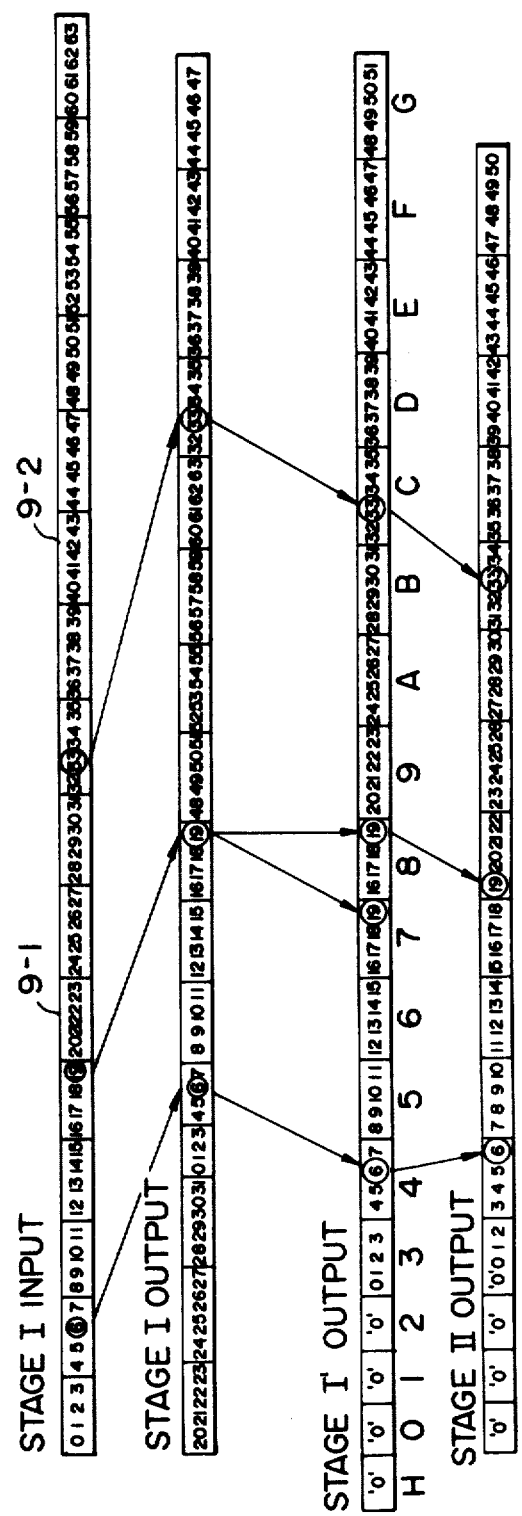
FIG. 22 is a diagram showing the state of shift in the shift system of the present invention.

The higher-order half of input data 0 to 63 is inputted in the input part 9-1 and the lower-order half in the input part 9-2. In the stage I output, the data inputted in the input part 9-1 is rotated to right by three partitions, that is, 12 bits, by the rotate-shift based on FIG. 16, whereas the data in the input part 9-2 is rotated to right by four partitions, i.e. 16 bits, by the rotate-shift based on FIG. 19. Then, in the stage I' output, the output selection control based on FIG. 15 takes place and, as a result of this, such data as shown in FIG. 22 is input into the select output part. In the stage II output, data in the partitions H to 7 of the select output part (in practice, the partitions H, 0 and 1 are 0) is shifted to right by one bit, and data in the partitions 8 to G of the select output part is shifted to left by three bits.

By limiting the shift in the shift part in the stage II to the right or left shift alone, as described above, the number of gates is much reduced as compared with that in the case of performing both of the right and the left shift, so that the structure can be simplified. In the operation diagrams of FIGS. 16 and 19, if RIGHT and LEFT are exchanged and if the bit positions 32 and 63 are changed to 31 and 0 respectively, the operations are exactly identical with each other. Accordingly, in this case the rotate parts can be formed by using the same chip having symmetrical circuit arrangements. In the case where the shift parts in the stage II comprise by two chips into which one chip is split at the center thereof, it is a matter of course that the same chip can be used as is the case with the rotate parts in the stage I.

As has been described in the foregoing, according to the present invention, in the case of forming the shift circuit with a plurality of LSI chips, the input data are divided so that the shift circuit may be formed in the same chip, and the shift rotation is mostly performed within the divided range, and the data are selectively taken out, so that the number of circuits with a chip-to-chip interface cross can be greatly reduced and, in addition, the problem of time lag resulting from the chip-to-chip interface cross during data shift can be solved.

Moreover, since the direction of rotation in the shift part can be restricted to one direction, the number of gates can be sharply reduced as compared with that in the case where use must be made of a shift part capable of shifting in both directions; consequently, the structure of the shift part can also be simplified. Furthermore, since 1's complement can be used for controlling the amount of rotation, the control operation is easy.

By dividing the shift part into those shifting data in reverse directions, the shift circuit can be formed using several kinds of LSI chips of identical arrangement so that the manufacturing cost can also be reduced.

It will be apparent that many modifications and variations may be effected without departing from the scope of the novel concepts of this invention.

What is claimed is:

1. A shift system operatively connected to receive $2^A N \times M$ bits of input data divided into M data units, where A, M and N are integers greater than 1, said shift system comprising:
   M rotate parts, each operatively connected to receive a corresponding data unit, for rotating, within each rotate part, each data unit by $P \times 2^A$ bits where $0 \leq P \leq N - 1$;
   M select parts, operatively connected to said M rotate parts, each of said M select parts having N select circuits and each of said M select parts for aligning portions of the M data units in units of $2^A$ bits, the Ith select circuit operatively connected to receive Ith $2^A$ bits from each rotate part and selecting from among same, where I is an integer greater than or equal to 1 and less than or equal to N;
   M shift parts, each operatively connected to the corresponding one of said M select parts, each receiving the corresponding portions of the M data units and shifting said corresponding portions of the M data units by Q bits, and outputting $2^A N \times M$ output bits, where Q is greater than or equal to 0 and less than or equal to $2^A - 1$; and
   a shift control part, operatively connected to said M rotate parts, said M select parts and said M shift parts, for controlling the rotation, alignment, selection and shifting of the input data.

2. A shift system operatively connected to receive input data having first and second data parts, said shift system comprising:
   a shift control part for generating rotate signals, select signals and shift signals;
   a first rotate part, operatively connected to receive the first data part, for rotating the first data part responsive to the rotate signals and for generating third and fourth data parts that are equivalent to each other therefrom;
   a second rotate part, operatively connectable to receive the second data part, for rotating the second data part responsive to the rotate signals and for generating fifth and sixth data parts that are equivalent to each other therefrom;
   a first select part, operatively connected to said first and second rotate parts, for merging the third and fifth data parts responsive to the select signals and for generating a seventh data part therefrom;
   a second select part, operatively connected to said first and second rotate parts, for merging the fourth and sixth data parts responsive to the selection signals and for generating an eighth data part therefrom;
   and first and second shift parts, operatively connected to said first and second select parts, respectively, for shifting the seventh and eighth data parts responsive to the shift signals.

3. A shift system according to claim 1 or 2, wherein each of said rotate parts is operatively connected to receive J consecutive input data bits where J is an integer and each comprises:
   J first circuits each operatively connected to said shift control part and the Jth first circuit operatively connected to the Pth input data bit, for selecting the Pth input data bit, where $P = K + L$, L equals 0, J/8, J/16, J/24, ..., $1 \leq K \leq J$ and when P is greater than J then $P = P - J$; and
   J second circuits each operatively connected to said shift control part and to the Rth first circuit, for selecting among the Rth first circuits, where $R = S$ and $S + 3$, where $1 \leq S \leq J$ and when R is greater than J then $R = R - J$.

4. A shift system according to claim 3,
   wherein each first circuit comprises four NOR gates each operatively connected to said shift control part and each NOR gate operatively connected to a different one of the Pth input data bits, and
   wherein each second circuit comprises first and second OR gates operatively connected to said shift control part and each OR gate operatively connected to a different one of the Rth first circuits.

5. A shift system according to claim 4, wherein each of said select parts comprises a plurality of pairs of NOR gates both NOR gates of each pair operatively connected to said shift control part, one of said NOR gates of each pair operatively connected to a corresponding one of said rotate parts and the other of said NOR gates in each pair operatively connected to a non-corresponding one of said rotate parts.

6. A shift system according to claim 5, wherein said shift part comprises third circuits, each third circuit operatively connected to said shift control part and a corresponding one of said pairs of NOR gates of a corresponding one of said select parts.

7. A shift system according to claim 6, wherein each of said third circuits comprises five NOR gates, each NOR gate operatively connected to said shift control part, the five NOR gates operatively connected to five consecutive pairs of NOR gates of a corresponding select part.

8. A shift system according to claim 7, wherein said shift control part comprises first and second shift control circuits for each of said rotate parts.

9. A shift system according to claim 8, wherein said first shift control circuit comprises:
 first and second exclusive OR circuits operatively connected to each of said NOR gate circuit sets of a corresponding one of said rotate parts; and
 a third exclusive OR circuit operatively connected to each of said OR gate/AND gate circuit sets of a corresponding one of said rotate parts.

10. A shift system according to claim 9, wherein said second shift control circuit comprises:
 a 4-bit shift control circuit operatively connected to each NOR gate in a corresponding one of said shift parts; and
 a 4-32 bit shift control circuit operatively connected to each NOR gate of said NOR gate pairs of a corresponding one of said select parts.

11. A shift system according to claim 2, wherein said first rotate part is formed on a first integrated circuit chip, said second rotate part is formed on a second integrated circuit chip, said first select part and said first shift part are formed on a third integrated circuit chip and said second select part and said second shift part are formed on a fourth integrated circuit chip.

12. A shift system according to claim 1, wherein said M rotate parts are formed on a first integrated circuit chip and said M select parts, said M shift parts and said shift control part are formed on a second integrated circuit chip.

13. A shift system according to claim 1, wherein said M rotate parts are formed on M integrated circuit chips, respectively, and said M select parts and said M shift parts are formed on different M integrated circuit chips, so that said shift system comprises 2M integrated circuit chips.

* * * * *

UNITED STATES PATENT AND TRADEMARK OFFICE
CERTIFICATE OF CORRECTION

PATENT NO. : 4,490,809

DATED : DECEMBER 25, 1984

INVENTOR(S) : KOHICHI UEDA ET AL.

It is certified that error appears in the above-identified patent and that said Letters Patent is hereby corrected as shown below:

Col. 1, line 36, after "each" insert --partition--;
line 39, after "each" insert --partition--.

Claim 1, line 53, "$<P<$" should be --$\leq P \leq$--.

Claim 3, line 42, "$\leq K \leq$" should be --$\leq K \leq$--;
line 47, "$\leq S \leq$" should be --$\leq S \leq$--.

Signed and Sealed this

Thirteenth Day of August 1985

[SEAL]

Attest:

DONALD J. QUIGG

Attesting Officer    Acting Commissioner of Patents and Trademarks